(12) United States Patent
Mullen et al.

(10) Patent No.: US 10,368,555 B2
(45) Date of Patent: Aug. 6, 2019

(54) REUSE OF ACTIVATED CHLOROUS AGENT FOR MEAT AND POULTRY TREATMENT (71) Applicant: ECOLAB USA INC., St. Paul, MN (US)

(72) Inventors: Michael R. Mullen, Woodbury, MN (US); Scott D. Hageman, Maryland Heights, MO (US); Scott A. Musgrave, Manchester, MO (US); Deborah Klein, Greensboro, NC (US); Petra Vogt, St. Paul, MN (US)

(73) Assignee: Ecolab USA Inc., St. Paul, MN (US)

( * ) Notice: Subject to any disclaimer, the term of this patent is extended or adjusted under 35 U.S.C. 154(b) by 368 days.

(21) Appl. No.: 14/839,870

(22) Filed: Aug. 28, 2015

(65) Prior Publication Data

US 2016/0058023 A1 Mar. 3, 2016

Related U.S. Application Data

(60) Provisional application No. 62/043,579, filed on Aug. 29, 2014.

(51) Int. Cl.
| | |
|---|---|
| A23B 4/22 | (2006.01) |
| A23B 4/24 | (2006.01) |
| A23B 4/12 | (2006.01) |
| A23B 7/10 | (2006.01) |
| A23B 7/157 | (2006.01) |
| A23B 9/26 | (2006.01) |
| A23B 9/30 | (2006.01) |

(52) U.S. Cl.
CPC ............ *A23B 4/24* (2013.01); *A23B 4/12* (2013.01); *A23B 7/10* (2013.01); *A23B 7/157* (2013.01); *A23B 9/26* (2013.01); *A23B 9/30* (2013.01); *A23V 2002/00* (2013.01); *Y02A 40/943* (2018.01)

(58) Field of Classification Search
CPC .... A23B 4/20; A23B 4/24; A23B 4/30; A23B 4/00; A23B 4/26; A23B 7/154; A23B 7/157; A23B 4/18; A23B 4/02; A23B 4/027; A23B 7/10; A23B 9/26; A23B 9/30
USPC .......... 426/332, 335, 310, 532, 644
See application file for complete search history.

(56) References Cited

U.S. PATENT DOCUMENTS

| | | |
|---|---|---|
| 5,389,390 A | 2/1995 | Kross et al. |
| 5,734,098 A | 3/1998 | Kraus et al. |
| 5,830,511 A | 11/1998 | Mullerat et al. |
| 6,063,425 A | 5/2000 | Kross et al. |
| 6,475,527 B1 | 11/2002 | Anderson et al. |

(Continued)

FOREIGN PATENT DOCUMENTS

| | | | |
|---|---|---|---|
| CA | 2505512 A1 | * | 5/2004 |
| WO | WO 2005067725 A2 | * | 7/2005 |

*Primary Examiner* — Vera Stulii
(74) *Attorney, Agent, or Firm* — Merchant & Gould P.C.

(57) ABSTRACT

The invention provides methods, apparatuses and compositions for the reduction of pathogenic and/or non-pathogenic organisms in raw meat. The invention includes simultaneously manufacturing and applying to raw meat an activated chlorous agent or other biocidal composition. By simultaneously manufacturing and applying the solution feedstocks such as contaminated components or recirculated used solution that would normally not work, can be used to effectively reduce pathogens in raw meat.

21 Claims, 6 Drawing Sheets (56) References Cited

U.S. PATENT DOCUMENTS

| | | |
|---|---|---|
| 6,761,911 B2 | 7/2004 | Anderson et al. |
| 7,550,060 B2 | 6/2009 | Jacobson et al. |
| 7,785,442 B2 | 8/2010 | Jacobson et al. |
| 7,887,850 B2 | 2/2011 | Warf et al. |
| 7,938,934 B2 | 5/2011 | Todorovic et al. |
| 7,981,251 B2 | 7/2011 | Jacobson et al. |
| 8,440,052 B2 | 5/2013 | Duggirala et al. |
| 2003/0039703 A1 | 2/2003 | Anderson et al. |
| 2004/0115322 A1* | 6/2004 | Osborn ............... A22B 5/0082 426/326 |
| 2006/0024405 A1 | 2/2006 | Warf et al. |
| 2007/0084802 A1 | 4/2007 | Hilgren et al. |
| 2007/0166441 A1 | 7/2007 | Adams et al. |
| 2008/0011788 A1 | 1/2008 | Jacobson et al. |
| 2009/0139676 A1 | 6/2009 | Todorovic et al. |
| 2009/0211721 A1 | 8/2009 | Jacobson et al. |
| 2010/0108566 A1 | 5/2010 | Scattergood et al. |
| 2010/0300632 A1 | 12/2010 | Duggirala et al. |
| 2012/0142113 A1 | 6/2012 | Banks et al. |
| 2013/0020041 A9 | 1/2013 | Duggirala et al. |
| 2014/0096971 A1 | 4/2014 | Keizer et al. |

\* cited by examiner

REUSE OF ACTIVATED CHLOROUS AGENT FOR MEAT AND POULTRY TREATMENT

CROSS-REFERENCE TO RELATED APPLICATIONS

This application claims the benefit of U.S. Provisional Patent Application Ser. No. 62/043,579, filed Aug. 29, 2014, the disclosure of which is incorporated herein by reference in its entirety.

STATEMENT REGARDING FEDERALLY SPONSORED RESEARCH OR DEVELOPMENT

Not Applicable.

BACKGROUND OF THE INVENTION

The invention relates to compositions, methods, and apparatuses for improving the production and recycling of antimicrobial fluids used to treat raw meat and poultry in meat and poultry slaughter and processing facilities. Fresh food animal products, including raw meat and poultry, are susceptible to contamination by microorganisms that contact meat surfaces immediately after slaughter and evisceration, including organisms in the gastrointestinal tracts which can be transferred during processing. Contaminating microorganisms include bacteria such as *Salmonella* and *Campylobacter* species, *Listeria monocytogenes*, *Escherichia coli* and other coliforms, and other enteric organisms. Once bacteria such as *Salmonella* contact tissue surfaces, they rapidly attach and are difficult to remove even with chlorine disinfectant permitted for use in poultry sprays and chill tanks. In beef processing, for example, a particularly virulent strain of *E. coli*, denoted O157:H7, reportedly contaminated hamburger meat sold by a fast-food chain and caused several deaths in the U.S. in 1993.

The problems created by *Salmonella* and *Campylobacter* bacteria in poultry products are particularly noteworthy. The presence of these organisms in food are serious dangers which impose significant costs and dangers. Improper cooking and physical transfer of the bacteria to food handling surfaces and thereafter to other foods result in the spread of the microorganisms, can cause gastrointestinal disorders and, in some cases, death.

Breeders, hatcheries, feed ingredient suppliers, farms, processors, and distributors have all been implicated as contributors to *Salmonella* contamination in chickens and turkeys (Villarreal, M. E., et al., J. Food Protection 53: 465-467 (1990)). Contamination of but a few birds can lead to broader range contamination of other birds and cross-contamination to carcasses. Bacterial proliferation and other signs of spoilage can be delayed by refrigeration, but there is a limit to the degree of refrigeration that can be imposed on meat products, short of freezing the meat, and some bacteria such as psychrophiles can survive and even flourish at temperatures approaching the freezing point. It is thus preferable to control and destroy pathogenic and other microbial contaminants during processing to reduce the number of organisms on the meat.

Poultry processing is similar to the processing of other meat animals. Briefly summarized, caged birds arrive by truck at the processing plant. Typically, the birds are not fed for at least one to four hours before slaughter to allow the bird's intestinal tract to clear, thereby lowering the risk of fecal contamination during subsequent processing. The birds are hung by their feet on shackles in a dressing line, stunned and bled via throat cuts. After bleeding and while still hung, the birds are scalded, plucked and transferred to an evisceration line, where they are manually or mechanically eviscerated, inspected and spray-washed. The spray may contain chlorine or other approved as a disinfecting agents. Historically, the last step of the process has been chilling in a hydro-chill tank, by movement through a counterflow of cold water containing chlorine or other approved antimicrobial agent are chilled, which usually takes about 45 minutes to one hour in a typical many-thousand gallon tank. The carcasses may additionally pass through a post chill spray, drench or dip antimicrobial treatment before being rehung, packaged or further processed into parts, other value-added products including but not limited to ground, mechanically separated and subsequently refrigerated or frozen.

*Salmonella*, *Campylobacter* and other organisms can survive the scalding process, which involves temperatures of about 50° C. to 58° C. Though cross-contamination can occur during any stage of processing, the major problems arise during and after evisceration when microorganisms are freed from the intestinal tract and transferred to other tissue surfaces. For example, the water becomes contaminated with organic matter and microbes from meat, and other organic matter provides nutrients for microbial growth over time or through additional use. The microbes can grow and contaminate additional meat, poultry, and equipment. Processing water can also serve as a source of contamination and cross-contaminate to other meat carcasses if organism in the water are not removed, inactivated or otherwise controlled.

A number of mechanisms have been attempted to address this problem. Such mechanisms include the application of chlorine, chlorine dioxide, peroxyacetic acids, GRAS acids, organic acids and mixtures thereof, octanoic acid, acetic acid, acidifed sodium chlorite, carnobacterium maltaromaticum stain CB1; cetylpyridinium chloride; citric acid; 1,3 di-bromo-5,5-dimethylhydantoin; citric acid, phosphoric acid, and hydrochloric acid mixtures; lactic acid; lactoferrin; lauramide arginine ethyl ester; nisin, oZone; hydrogen peroxide; peroxyacetic acid; peroxyoctanoic acid; potassium diacetate; lactic acid and acidic calcium sulfate mixtures; lactic acid, acidic calcium sulfate, and propionic acid mixtures; lactic acid, calcium sulfate, and sodium phosphate mixtures; sodium metasilicate; trisodium phosphate; or combinations thereof. An example of a suitable commercially available antimicrobial solution includes, but is not limited to: irradiation, trade designated SANOVA® acidifed sodium chlorite, available from Ecolab, Incorporated, Saint Paul, Minn.; and high pressure pasteurization applied during various stages of the meat/poultry handling process. As described in U.S. Pat. Nos. 7,887,850, 6,475,527, 6,761,911, 6,063,425, 5,830,511, and 5,389,390, the use of metal chlorites/chlorates are a particularly effective strategy for reducing or eliminating microbiological contamination of raw meat and poultry.

An impediment to the use of such metal chlorites/chlorates however is the cost and expense of producing and applying them. Metal chlorites/chlorates typically are acidified to a very narrow pH range to obtain a specific pKa value and to be highly selective regarding which chlorine species are produced. Efficient in situ maintenance of such conditions is an ongoing challenge in the industry. Moreover this complexity has proven to make the re-use of already used metal chlorite/chlorate solutions extremely difficult. As a result the cost of applying metal chlorite/chlorate antimicrobial solutions is much higher than is optimal.

Thus there is clear utility in novel methods, chemicals, and apparatuses for the production and re-use of antimicrobial fluids used to treat raw meat and poultry in meat and poultry slaughter and processing facilities. The present invention addresses these needs and provides further related advantages.

The art described in this section is not intended to constitute an admission that any patent, publication or other information referred to herein is "prior art" with respect to this invention, unless specifically designated as such. In addition, this section should not be construed to mean that a search has been made or that no other pertinent information as defined in 37 CFR § 1.56(a) exists.

BRIEF SUMMARY OF THE INVENTION

To satisfy the long-felt but unsolved needs identified above, at least one embodiment of the invention is directed towards a method for reducing microbial populations in raw meat. The method comprises the steps of: essentially simultaneously manufacturing and applying an antimicrobial solution to raw meat.

The manufacturing may occur within a rapid mixing apparatus. At least some of the antimicrobial solution may be formed from recirculated fluid that has previously been in contact with raw meat. But for the simultaneous manufacturing and application, materials in the recirculated fluid may cause the chlorous acid to degrade prior to its application to the raw meat. The method may further comprise measuring the content of the recirculation fluid and adding an appropriate amount of acid, metal chlorite, a nonmetal chlorite source, and any combination thereof. The solution may be manufactured at least in part from a metal chlorite, the metal selected from group consisting of sodium, potassium, and any combination thereof. The solution may be manufactured at least in part from an acid, the acid selected from the group consisting of: citric acid, sodium acid sulfate, phosphoric acid, lactic acid, malic acid, fumaric acid, acetic acid, and any combination thereof. Between about 5 microseconds to about 500 milliseconds may elapse between the manufacturing begins and the solution is applied to raw meat. The manufacturing may occur within 0.01-50 inches of the location at which the solution is applied to the raw meat.

The manufacturing may occur within a mixing apparatus. The mixing apparatus may comprise a first conduit having one or more inlets and outlets, a second conduit having one or more inlets and outlets, a mixing chamber, and an adaptor. The first conduit secures to the second conduit and traverses the second conduit. The mixing chamber that has one or more inlets and outlets. The second conduit secures to the mixing chamber. The outlets of the first conduit and the outlets of the second conduit may be in communication with the mixing chamber. The adaptor is in communication with the outlet of the mixing chamber and is secured to the mixing chamber. The mixing apparatus may be mounted via an adaptor to an opening into a dipping vat or spray chamber constructed and arranged to apply the solution to raw meat, The method may further comprise the steps of introducing one components for forming the solution in said mixing chamber of said apparatuses by introducing one or more chemical components used to manufacture the solution into said inlets of said first conduit and said second conduit of said apparatuses, mixing said chemicals in said mixing chamber of said apparatuses to form the solution and dispensing the solution through said adaptor of said apparatuses that is in communication with the raw meat. The chemicals may be introduced sequentially, simultaneously or in a pre-programmed order. The chemicals may be pumped into one or more of the outlets. The antimicrobial solution may be formed from recirculated fluid that has previously been in contact with raw meat. But for the simultaneous manufacturing and application, materials in the recirculated fluid might cause the chlorous acid to degrade prior to its application to the raw meat. The microbial population may at least in part be pathogenic.

The method may use an antimicrobial solution that has essentially the identical properties and composition to the reaction product formed from the reaction between a metal chlorite in an amount of from 0.01% to 0.1% by weight of a solution and a sufficient quantity of an acid having a first pKa of from about 2.0 to about 4.4 at a pH of 2.2 to about 4.5 to maintain chlorite ion concentration in the form of chlorous acid to not more than about 35% by weight of the total chlorite ion present in the aqueous antimicrobial solution. The essentially identical properties and composition however do not necessarily include the metal from the metal chlorite.

The method may use an antimicrobial composition which comprises at least one item selected from the group consisting of activated chlorous acid, peracetic acid, peroxyacid mixture comprising acetic acid, octanoic acid, hydrogen peroxide, peroxyacetic acid, peroxyoctanoic acid, 1-hydroxyethylidene-1,1-diphosphonic acid, chlorine dioxide, monochloramine, acidified sodium chlorite, non-chlorine halogen compounds including, but not limited to: iodines, iodophors, bromines, brominated compounds, quaternary ammonium compounds including, but not limited to: quaternary ammonium chlorides, cetylpyridinium chloride, organic acids, citric acid, propionic acid, mineral acids, phosphoric acid, hydrochloric acid, sulfuric acid, GRAS acids sodium metasilicate, potassium metasilicate, and any combination thereof. The antimicrobial composition may be formed from the resultant of a biocide composition material that has previously been applied to raw meat in a meat processing operation.

Additional features and advantages are described herein, and will be apparent from, the following Detailed Description.

BRIEF DESCRIPTION OF THE DRAWINGS

A detailed description of the invention is hereafter described with specific reference being made to the drawings in which.

For the purposes of this disclosure, like reference numerals in the figures shall refer to like features unless otherwise indicated. The drawings are only an exemplification of the principles of the invention and are not intended to limit the invention to the particular embodiments illustrated.

DETAILED DESCRIPTION OF THE INVENTION

The following definitions are provided to determine how terms used in this application, and in particular how the claims, are to be construed. The organization of the definitions is for convenience only and is not intended to limit any of the definitions to any particular category.

"GRAS" means generally recognized as safe, one definition of which is provided in the US Code of Federal Regulations Title 21.

"Raw Meat" means some or all of an animal carcass or material derived from an animal that is being handled at some point within a meat processing operation, such meat includes but is not limited to flesh, skin, muscle, marrow, cartilage, organs, tissue, and any other body parts from chickens, cows, pigs, goats, cattle, turkeys, ducks, quail, geese, sheep, horses, cattle, fish, shellfish, sea animals, meat reptiles, insects, poultry birds, meat trim, animal parts, animal fats, animal trim, beef, veal, and the like.

"Organoleptic Characteristic" means describing the attributes of food, in particular meat and meat products, that can be perceived by the sense organs, the attributes to be evaluated include: appearance, color, texture and consistency, smell and taste, representative examples of protocols for measuring one or more attributes of organoleptic characteristics can be found in one or more of: the textbook: *Manual on Simple Methods of Meat Preservation*, Issue 79, pp. 1-87 (and in particular Introduction Section 5 Basic methods of quality control), Food and Agriculture Organization of the United Nations, (1990), the website: *HACCP-based Inspection Models Project In-plant Slaughter*, United States Department of Agriculture Food Safety and Inspection Service (1998) having a URL of http://www.fsis.usda-.gov/Oa/haccp/himp.htm, the textbook: *Microbiology Laboratory Guidebook* 3rd Edition Vol. 1-2, by BP Dey et al, United States Department of Agriculture Food Safety and Inspection Service (1998), and the paper: *Meat Quality Attributes of broilers supplemented with Herbal Toxin binder Product*, by V S Waskar et al, Veterinary World, Vol. 2 (7) pp. 274-277 (2009).

"Meat Processing Operation" means at any point in the process of converting a living animal or any part thereof into a meat product ready for sale or use in the consumer marketplace, it includes but is not limited to one or more of such steps as pre-slaughtering preparation, slaughtering, eviscerating, de-feathering, skinning, deboning, part sorting, organ removal, meat packing, fat rendering, cutting, chopping, mechanically separating, comminuting, mixing/tumbling, curing, spicing, adding non-meat additives, stuffing/filling into casings or other containers, fermenting, drying, chilling, freezing, cooking, irradiating, smoking, salting, blood draining, pickling, heating, dipping, spraying, and the like, and/or any step conducted prior to or subsequent to any one or more of these steps. "Activated Chlorous Agent" means a solution having substantially the same composition and properties as the solution that result from the reaction of a chlorite ion (including but not limited to ions released by metal chlorites) and an acid under acidic conditions, it includes but is not limited to solutions that contain substantially no molecular chlorine, chlorine dioxide, nor sodium hypochlorite species, it also includes but is not limited to those compositions described in U.S. Pat. Nos. 5,389,390, 6,063,425, and 7,887,850, as well as compositions having substantially the same composition and properties as described in those patents except that they differ in or altogether lack anions, metals, and/or metal ions.

In the event that the above definitions or a description stated elsewhere in this application is inconsistent with a meaning (explicit or implicit) which is commonly used, in a dictionary, or stated in a source incorporated by reference into this application, the application and the claim terms in particular are understood to be construed according to the definition or description in this application, and not according to the common definition, dictionary definition, or the definition that was incorporated by reference. In light of the above, in the event that a term can only be understood if it is construed by a dictionary, if the term is defined by the *Kirk-Othmer Encyclopedia of Chemical Technology*, 5th Edition, (2005), (Published by Wiley, John & Sons, Inc.) this definition shall control how the term is to be defined in the claims. All illustrated chemical structures also include all possible stereoisomer alternatives.

At least one embodiment of the invention is directed towards a method of generating activated chlorous agent. The method involves the substantially simultaneous: a) formation from its components and b) feeding, of the activated chlorous agent into a meat processing operation. The formation may involve the mixing of a metal chlorite and an acid under rapid mixing conditions. The method may include re-using fluid containing a solution that once contained activated chlorous agent (and which may or may not still contain some activated chlorous agent) and which has previously contacted raw meat.

Representative examples of activated chlorous agent include but are not limited to those are described in U.S. Pat. Nos. 5,389,390, 6,063,425 and 7,887,850 as well as certain acidified sodium chlorite products (e.g., SANOVA® by Ecolab, St. Paul Minn.) have been approved by the F.D.A. (21 C.F.R. 173.325) as antimicrobial sprays and/or dips for the treatment of pre-chill poultry carcasses, parts and pieces, red meat carcasses, red meat trim, seafood, and raw agricultural commodities. It has now been found that the pathogens in the gastrointestinal tract of a live animal, such as poultry, may be reduced by orally administering certain of the foregoing aqueous antimicrobial activated chlorous agent solutions to the animal.

In at least one embodiment the generated aqueous antimicrobial solution comprises from about 0.01% to about 0.1% by weight of a metal chlorite and a sufficient quantity of an acid having a first pKa of from about 2.0 to about 4.4 to adjust the pH of the aqueous antimicrobial solution to about 2.2 to about 4.5 and to maintain the chlorite ion concentration in the form of chlorous acid to not more than about 35% by weight of the total chlorite ion present in the aqueous antimicrobial solution. In at least one embodiment the pH of the solution when applied to the raw meat is 2.3-2.9. In at least one embodiment the solution contains 100-3000 ppm chlorite species.

Metal chlorites useful in this invention include alkali chlorites such as sodium or potassium chlorite, or a mixture of the same may be used in the practice of this invention. For example, in one embodiment, the alkali metal chlorite is sodium chlorite.

Acids useful in this invention include but are not limited to acids that have a first pKa value of about 2 or higher, although acids of pKa values greater than about 5 are often not appropriate for this application. In at least one embodiment the acid does not fully ionize upon dissolution in water. In at least one embodiment the acid is further limited to the group of acids in which no more than about 1 in 100 of its first ionizable acid groups will dissociate in aqueous solution. In at least one embodiment the acid is selected from the list consisting of sodium acid sulfate, phosphoric acid, citric acid, lactic acid, malic acid, fumaric acid and acetic acid, any GRAS acid, or mixtures of the same, and any combination thereof.

Simultaneous formation and application of the activated chlorous agent solution result in a number of benefits which are quite unexpected. First this greatly aids in the efficiency of the formation process.

In order to provide an accurate mixing and delivering a consistent concentration of activated chlorous agent, chlorite typically should be properly diluted first in water. Then the diluted acid and the diluted base are combined to generate activated chlorous agent. Combining the concentrates in water without them being fully mixed often creates distinct areas ("pockets") of diverging high and low pH. The pockets of low pH can result in high chlorous acid levels that subsequently form a higher, undesired level of chlorine dioxide. This is because the formation of chlorous acid takes place instantly and is driven by the pH of the solution environment. It is therefore essential for the formation of a consistent and sufficient amount of activated chlorous agent to allow for a proper pre-dilution, in particular of the acid component.

Moreover chlorite ions have the potential to form a number of chlorine bearing species that are undesirable such as molecular chlorine, chlorine dioxide, and sodium hypochlorite species. These species are undesirable for health, safety, regulatory, and other reasons. Only under specific conditions of pH, pKa, and stoichiometric ratios will adequate amounts of activated chlorous agent result or will reduce populations of the undesirable species result. Moreover over time the activated chlorous agent degrades and may produce more and more of the unwanted species, and/or loses potency as the concentration of chlorous acid decreases. Organic debris inherent to meat and poultry and processing hastens degradation of chlorous acid, therefore a biocide solution applied at this processing step must have higher level of chlorite and higher proportion of chlorous acid for optimal efficacy. Chlorous acid (chlorite+acid) is consumed by the disinfection process.

This leads to an unwanted tradeoff between having prepared solutions conveniently available and in close proximity to point of application for immediate use and having a pure/highly potent solutions available. Without the ability to simultaneously form and apply the activated chlorous agent, only with extreme coordination between the meat handling process and chlorous acid formation process can reasonable efficiencies and efficacies be obtained. And even then unless there is true simultaneousness, some degradation will have occurred and the applied activated chlorous agent will be less potent than optimal and/or will be in an amount which is less than optimal. Thus simultaneously forming and applying the activated chlorous agent results in an application having greater potency than non-simultaneously formed and applied chlorous acid.

Also, because simultaneous formation and application results in a more robust solution, it allows for the efficient use of feedstocks that would otherwise be inapplicable for use. For example feedstocks containing other materials or contaminants that compete with or otherwise impair the reaction that forms activated chlorous agent can now be used. This is because a short time frame exists between the formation and application so the solution will have already been applied and imposed its antimicrobial effects before the chlorous acid degrades.

One example of such a feedstock is used/recovered solution fluid that has already contacted raw meat. When raw meat is either sprayed with or dipped into activated chlorous agent, it reacts with the chlorous acid to form a number of organic species. These species contain the materials necessary to re-form additional activated chlorous agent but they thermodynamically impair such a reaction. When such a used solution is rapidly mixed however, the otherwise unobtainable activated chlorous agent can be formed for at least short periods of time. In at least one embodiment the recovered composition is treated by adding sufficient amount of acid or chlorite chemistries into a stream of recovered antimicrobial solution previously applied to meat to bring back to its ideal concentration and pH to yield a recycled acidified sodium chlorite antimicrobial solution.

This is especially the case when the activated chlorous agent is formed by the reaction of a metal chlorite with an acid of 2-5 pKa. Such a reaction is greatly impaired or is rapidly degraded when in contact with the other organic species. Under essentially simultaneous formation and application conditions however the desired activated chlorous agent can be used.

In at least one embodiment the activated chlorous agent is formed by the reaction of a metal chlorite with an acid of 2-5 pKa in which at least some of the metal chlorite and/or some of the acid is material which is in a fluid that has previously contacted raw meat.

This allows for the use of an activated chlorous agent dip vessel or spray chamber constructed and arranged to use recirculating streams in which the drainage from the dip vessel or spray chamber is recovered, re-mixed and/or reacted and is then re-fed into the dip vessel or spray chamber. In at least one embodiment the spray chamber is one constructed and arranged according to one or more of the disclosures in US Published Patent Application 2007/0166441. Embodiments may also or further include one or more of the features described in US Patent Application 2007/0084802 that facilitate the construction and arrangement of a recirculating system applied mutatis mutandis, in which the device for simultaneously producing and applying the activated chlorous agent is upstream from and/or immediately upstream from the point at which the microbiological agent is dispensed (for example its reference#36 dispenser). In at least one embodiment additional features are present to address the removal of fat, oils, skin, bones, and other materials which are deposited into the solution by contact with the raw meat and would otherwise clog or otherwise impair the recirculation of the fluid.

It is further understood that the invention is not limited to biocide compositions comprising acitivated chlorous agent. In at least one embodiment the composition simultaneously manufactured and applied comprises a biocide other than acitivated chlorous agent. In at least one embodiment the composition simultaneously manufactured and applied comprises a both a biocide other than acitivated chlorous agent and acitivated chlorous agent.

Figure 1:
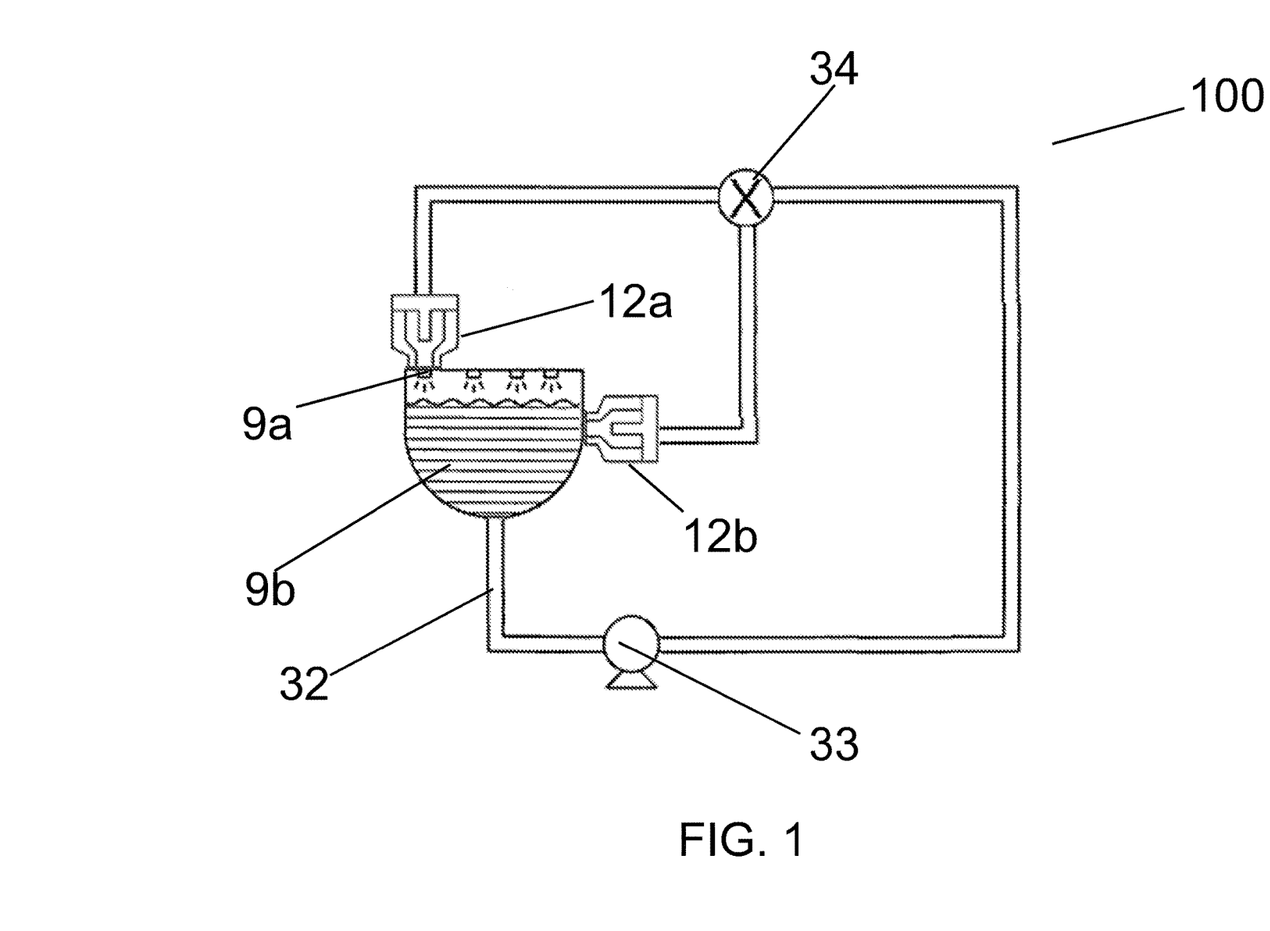
FIG. 1 is an illustration of a process flow diagram for recirculating used anti-microbial fluid.

Referring now to FIG. 1 there is shown an embodiment of a system (100) constructed and arranged to collect and recirculate used fluid. A raw meat treating apparatus includes items such as one or more of a raw meat dip (9b) or raw meat spray (9a) which applies an activated chlorous agent bearing solution. While FIG. 1 illustrates an embodiment containing both a dip and a spray, it is understood that the invention encompasses embodiments which include only one of these devices and/or other devices suitable for applying an activated chlorous agent bearing solution to raw meat. It is understood that any suitable cleaning agent, antimicrobial agent, detergent, surfactant, chelating agent, defoaming agent, polyphosphate, acidulant, alkali, or water conditioning agent may be utilized with present invention. After such application, the solution mixes and reacts with any fluid already in the apparatus and with materials removed from the raw meat to form used fluid. The used fluid can be collected/recovered for example via a drain (32) or other catchment device. A pump (33) or other device may optionally be used to facilitate the circulation of the used fluid. Such pump(s)/device(s) may be located at any one or more locations downstream from the catchment device and upstream from the treating apparatus.

The system (100) may be further constructed and arranged to make use of one or more mechanisms, devices, and/or methods including but not limited to those described in US Published Patent application 2007/0084802 to further process the recirculating used fluid so as to prevent clogs, blockages, and/or otherwise facilitate the proper flow and/or pre-conditioning of the used fluid. Similarly the system may also contain a drain to divert away excess, overflow, and/or unwanted used fluid. The reclaimed antimicrobial solution can be recaptured and reused during any stages of the reapplication process.

In the event that the system is constructed and arranged to direct the used fluid to one or more potential end uses, one or more valves (34) may appropriately direct the fluid. The fluid is then introduced into a rapid mixing device (12a, 12b) where it essentially simultaneously forms the activated chlorous agent bearing solution and is then applied to the raw meat. One or more additional feed lines may optionally feed one or more additional reagents (including but not limited to metal chlorite, some other source of chlorite ions, and/or acid) into the rapid mixing device (12) to facilitate the formation of activated chlorous agent bearing solution of desired properties and composition.

Figure 2:
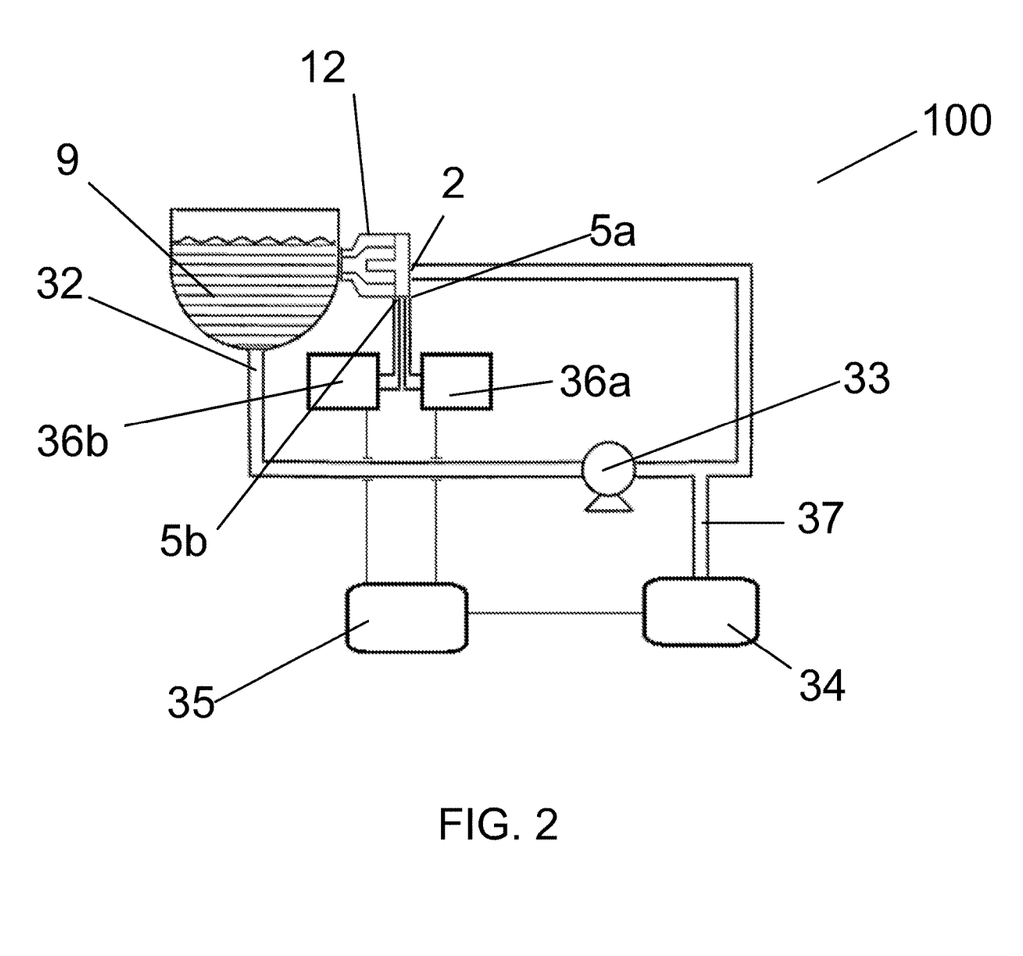
FIG. 2 is an illustration of a process flow diagram for mixing reagents and/or recirculating used anti-microbial fluid.

Referring now to FIG. 2 there is shown an embodiment of a system (100) constructed and arranged to optimize between collection and recirculation of used fluid and the production of new activated chlorous agent. The system comprises an activated chlorous agent-raw meat application site (9). While FIG. 2 illustrates this in the form of a dip, a spray chamber or any other application device may be used. A drain or catchment device (32) collects used fluid after it has contacted raw meat. At some point a sensor device (34) (analytically) measures at least one property of the fluid. The property may be any one or more of: turbidity, oil content, fat content, viscosity, pH, oxidation-reduction potential, corrosion content, metal ion content, chlorous acid content, one or more chlorine bearing species content, and any combination thereof. Optionally the sensor device (34) device receives its input from a side stream (37) diverted form the recirculating fluid flow which can be disposed of or returned after the sensor's analysis. Representative examples of sensor devices include some or all of any of the devices described in US Published Patent Applications 2012/0142113 and 2010/0108566, as well as U.S. Pat. No. 5,734,098.

The sensor device (34) is in informational communication with a controller device (35) whose process logic controls the introduction of one, two, or more chlorous acid forming component feed sources (36a, 36b) into the rapid mixing device (12). The process logic is such that in response to various measured properties of the recirculating fluid, the amount of one or more regents from one or more of the feed source(s) is fed into the rapid feed mixer (12). The system may alternatively feed the recirculating fluid into the rapid feed mixer (12) in the absence of any or all additional reagents, may feed one or more reagents into the rapid feed mixer (12) in the absence of any recirculating fluid, or may combine any amount of recirculating fluid and any one or more reagents as appropriate.

While FIG. 2 illustrates two reagent feeds sources, any number may be used. In addition while FIG. 2 illustrates the recirculating flow passing through an inlet (2) and the feed sources passing through two perpendicular inlet (5a, 5b), the various inlets may be of any number and any arrangement. In at least one embodiment one of the feed sources is a chlorite ion source such as a metal chlorite. In at least one embodiment one of the feed sources is an acid source. In at least one embodiment one of the feed sources is a diluent such as water or another solvent or carrier fluid. FIGS. 1 and 2 are equally applicable to biocides other than or in addition to activated chlorous agent.

In at least one embodiment some or all of the reagents used to produce the activated chlorous agent (and/or other biocide(s)) are mixed and introduced through the use of a rapid mixing apparatus. Representative examples of such rapid speed mixing apparatuses include but are not limited to those described in U.S. patent application Ser. No. 13/645,671 (Published as 2014/0096971) as well as U.S. Pat. Nos. 7,550,060, 7,785,442, 7,938,934, 8,440,052, and 7,981,251. A representative example of such a rapid mixing apparatus is a PARETO® device produced by Nalco Company, Naperville, Ill. Such a rapid mixing apparatus may be constructed and arranged to substantially simultaneously produce and apply the activated chlorous agent.

Figure 3:
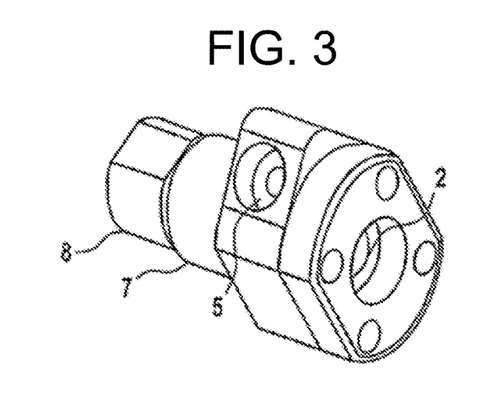
FIG. 3 is a side elevation view of an apparatus according to one embodiment of the present invention.
Figure 4:
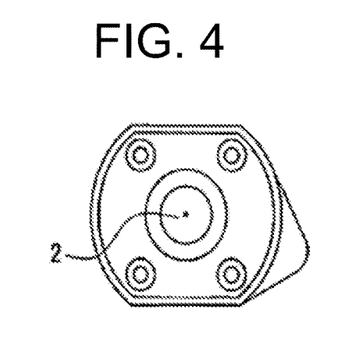
FIG. 4 is a cross-sectional view of the apparatus of FIG. 3.
Figure 5:
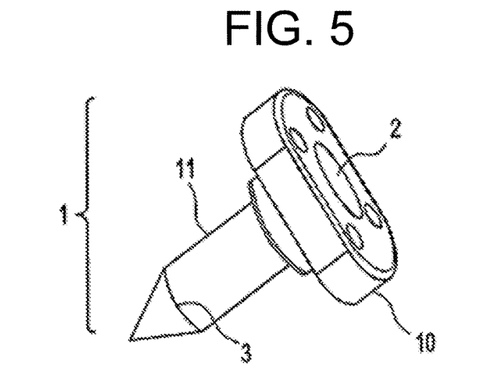
FIG. 5 is a side elevation view of the first conduit of the apparatus of FIG. 3.
Figure 6:
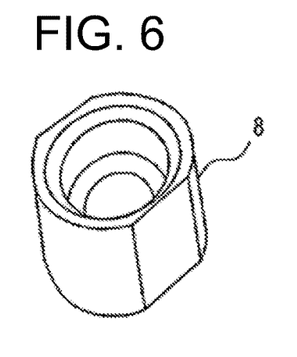
FIG. 6 is a side elevation view of the adaptor of the apparatus of FIG. 3.
Figure 7:
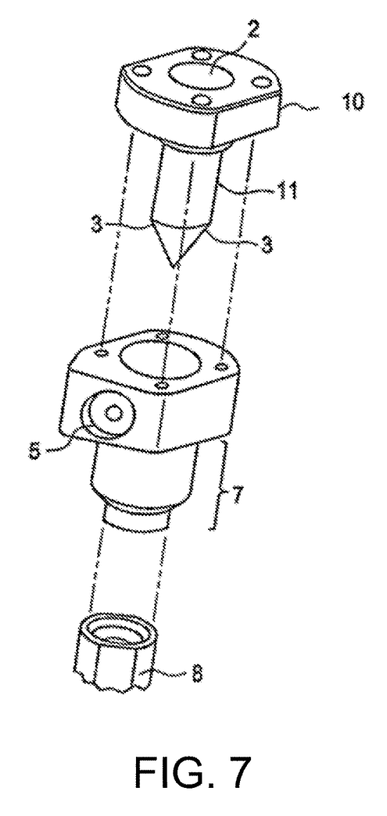
FIG. 7 is an exploded side elevation view of the first conduit, second conduit, mixing chamber and adaptor of one embodiment of the present invention.
Figure 8:
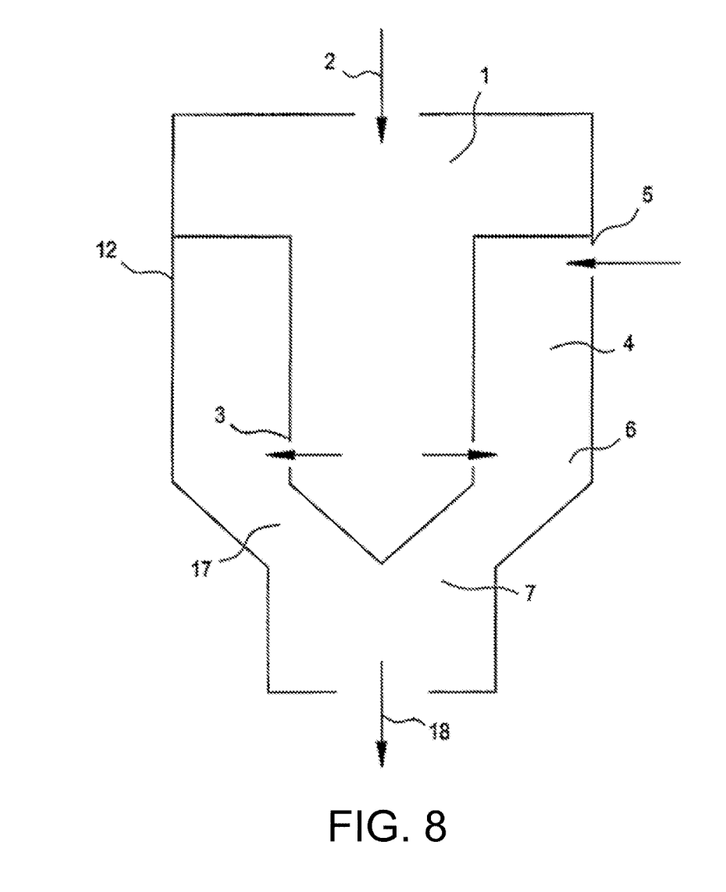
FIG. 8 represents a schematic illustration of an apparatus of the present invention.
Figure 9:
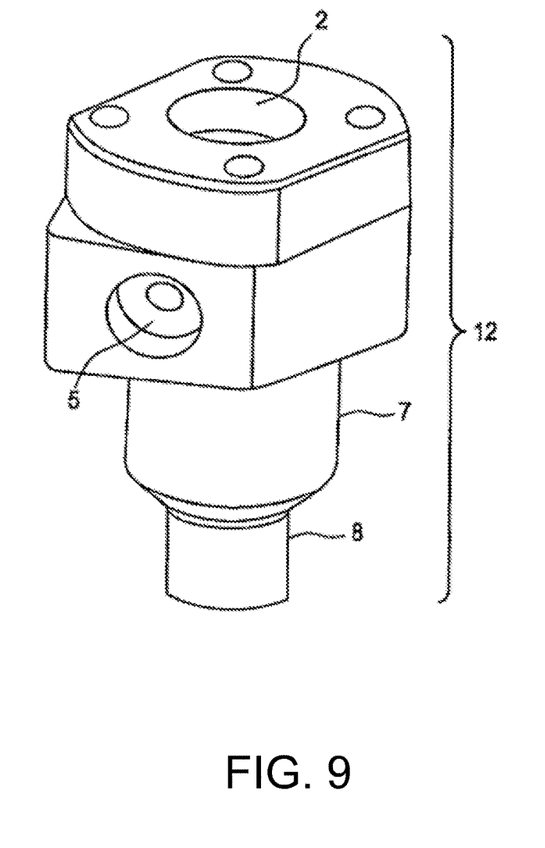
FIG. 9 is a side elevation view of an apparatus according to one embodiment of the present invention.

Referring now to FIG. 3 is an embodiment of how the rapid mixing apparatus (12) may be constructed and arranged. The apparatus includes four primary components: a first conduit (1); a second conduit (4); a mixing chamber (7); and optionally an adaptor (8). The dimensions and geometries of each element of the apparatus depends upon how much anti-microbiological agent chemical needs to be added to raw meat processing operation, as well other factors, such as the construction of the process stream conduit(s) that transfers fluid from one point to another (9). The apparatus of the present invention may be made of any suitable material for handling various types of anti-microbiological agent chemicals, for example, stainless steel.

The first conduit (1) has one or more inlets (2) and outlets (3). Preferably, the conduit has both a head portion (10) and a portion (11) that is conical in shape. The second conduit (4) has one or more inlets (5) and outlets (6). The second conduit (4) secures to the first conduit's head portion (10) by any fastening means that would be appreciated by one of ordinary skill in the art, for example, the head portion (10) of the first conduit and the second conduit (4) may have one or more openings so that a screw can secure one conduit to another.

The mixing chamber (7) has one or more inlets (17) and outlets (18) that are in communication with the outlets of both the first conduit (1) and the second conduit (4). The mixing chamber (7) secures to the second conduit (4). The mixing chamber (7) may secure to the second conduit (4) by any fastening means that would be appreciated by one of ordinary skill in the art, for example, both the second conduit (4) and the mixing chamber (7) may have one or more openings so that a screw can secure the second conduit to the mixing chamber, or the outer surface of the mixing chamber (7) can fuse to the outer surface of the second conduit (4).

The adaptor (8) secures to the mixing chamber (7) and is in communication with the outlets of the mixing chamber (7). The adaptor (8) may secure to the mixing chamber (7) by any fastening means that would be appreciated by one of ordinary skill in the art, for example, a portion of the mixing chamber (7) may insert into the adaptor (8).

In another embodiment, the inlets (5) of said second conduit (4) are perpendicular to said outlets of said second conduit (4). In another embodiment, the first conduit (1) traverses said second conduit (4) perpendicular to the inlets (5) of said second conduit (4). In another embodiment, the first conduit (1) has a head portion (10) that does not traverse said second conduit (4) and a portion that traverses said second conduit (4), wherein the portion (11) that traverses said second conduit (4) is conical in shape and wherein the point of said first conduit (1) is in communication with said mixing chamber (7).

In at least one embodiment, the (12) adaptor (8), alone or as part of the apparatuses for feeding, is mounted over an opening (16) in raw meat treating apparatus (9) and the adaptor (8) is secured to the raw meat treating apparatus (9) by any means that would be appreciated by one of ordinary skill in the art. The feeding apparatus of the present invention, if not already done so, is connected with the adaptor. After this setup is established, one or more chemicals and a feeding liquid are introduced into the apparatus (12), mixed in the mixing chamber (7), and fed into the raw meat treating apparatus (9).

In another embodiment, the co-feeding of different chemicals into a raw meat treating apparatus (9) can be achieved by the following steps: introducing several different chemicals into the apparatus (12), allowing a mixture of the different chemicals to form, and dispensing the mixture into the raw meat treating apparatus (9); or by aligning a series of apparatuses (12) and dispensing chemicals. Chemicals may be added to the system in any order prescribed by a person of ordinary skill in the art. For example, chemicals maybe added sequentially, simultaneously or in pre-programmed order.

In another embodiment, the mixing is a staged mixing-mixing of chemicals prior to their introduction into the raw meat treating apparatus (9). Staged mixing lasts for a time period that comports with the desired reaction rate of the chemicals fed into the mixing apparatus. In yet a further embodiment, the staged mixing lasts from about 5 microseconds to about 500 milliseconds.

In another embodiment, the activity of said chemicals is controlled by adjusting the flow rate of said chemicals and said feeding liquid, which are introduced into said apparatuses. One or more pumps that are in communication with said apparatuses may adjust the flow rate of the chemicals and the feeding liquid that are being introduced into the apparatus of the present invention. Staged mixing can be achieved in the mixing chamber by controlling flow rates of the chemicals and the feeding liquid into the mixing chamber.

In another embodiment, the activity of said chemicals, prior to their introduction into said raw meat treating apparatus (9), is controlled by adjusting the flow rate of said chemicals and said feeding liquid, which are introduced into said mixing chamber.

In another embodiment, the chemicals are diluted with a dilution liquid prior to their introduction in said first conduit (1) or said second conduit (4). In yet a further embodiment, the dilution liquid contains water.

In at least one embodiment, the applied composition comprises or further comprises peroxyacid mixture comprising acetic acid, octanoic acid, hydrogen peroxide, peroxyacetic acid, peroxyoctanoic acid, and 1-hydroxyethylidene-1,1-diphosphonic acid, or any combination thereof. Representative examples of such materials include one or more of the products with the trade name INSPEXX 100, INSPEXX 200, and INSPEXX 150 (by Ecolab, St. Paul Minn.).

In at least one embodiment, the antimicrobial solution comprises or further comprises at least one item selected from the group of chlorinated compounds including, but not limited to: chlorine dioxide, monochloramine, acidified sodium chlorite, and mixtures thereof. In at least one embodiment, the antimicrobial solution comprises or further comprises an item selected from the group of non-chlorine halogen compounds including, but not limited to: iodines, iodophors, bromines, brominated compounds, and mixtures thereof. In at least one embodiment, the antimicrobial solution comprises or further comprises an item selected from the group of quaternary ammonium compounds including, but not limited to: quaternary ammonium chlorides, cetylpyridinium chloride, and mixtures thereof. In at least one embodiment, the antimicrobial solution comprises or further comprises an item selected from the group of comprised of organic acids (e.g., lactic acid, citric acid, propionic acid), mineral acids (e.g., phosphoric acid, hydrochloric acid, sulfuric acid), GRAS acids and mixtures thereof. In an alternative embodiment, the antimicrobial solution comprises or further comprises sodium metasilicate, potassium metasilicate, and mixtures thereof.

In at least one embodiment the re-use of fluid containing a solution that once contained activated chlorous agent (and which may or may not still contain some activated chlorous agent) and which has previously contacted raw meat and which has then been passed through a rapid mixing apparatus results in a number of efficiency gains representing unexpected results. These can be seen when one compares a series of targeted raw meat samples, some of which are treated only with a fresh composition (a composition containing non-reused activated chlorous agent) and some are treated with a reused composition (a composition in which re-used fluid comprises between 0.01% to 99.99% of the composition and fresh composition comprises between 0.01% to 99.99% of the composition). These benefits may include the sample treated by the reused composition (as compared to the sample treated by the fresh composition) displaying one or more of:

A decrease of between 1% and 99% (including $\geq 50\%$) in acid used with substantially no increase in resulting microbial population on the treated raw meat.

A decrease of between 1% and 99% (including $\geq 50\%$) in acid used with a proportionally lower increase in resulting microbial population on the treated raw meat.

A decrease of between 1% and 99% (including $\geq 50\%$) in chlorite used with substantially no increase in resulting microbial population on the treated raw meat.

A decrease of between 1% and 99% (including $\geq 50\%$) in chlorite used with a proportionally lower increase in resulting microbial population on the treated raw meat.

A decrease of between 1% and 99% (including $\geq 50\%$) in water used with substantially no increase in resulting microbial population on the treated raw meat.

A decrease of between 1% and 99% (including $\geq 50\%$) in water used with a proportionally lower increase in resulting microbial population on the treated raw meat.

A decrease of between 1% and 99% (including ≥50%) in energy (for example measured in kwh) used with substantially no increase in resulting microbial population on the treated raw meat.

A decrease of between 1% and 99% (including ≥50%) in energy (for example measured in kwh) used with a proportionally lower increase in resulting microbial population on the treated raw meat.

A decrease of between 1% and 99% (including ≥50%) in volume of wastewater discharged from the meat processing operation generated with substantially no increase in resulting microbial population on the treated raw meat.

A decrease of between 1% and 99% (including ≥50%) in volume of wastewater discharged from the meat processing operation generated with a proportionally lower increase in resulting microbial population on the treated raw meat.

A decrease of between 1% and 99% (including ≥50%) in volume of gaseous emissions discharged from the meat processing operation generated with substantially no increase in resulting microbial population on the treated raw meat.

A decrease of between 1% and 99% (including ≥50%) in volume of gaseous emissions discharged from the meat processing operation generated with a proportionally lower increase in resulting microbial population on the treated raw meat.

Any one of the above in which the specific microbial population measured is *Salmonella*.

Any one of the above in which the specific microbial population measured is *Campylobacter*.

Any one of the above in which the specific microbial population measured is more than one species of microbiological organisms.

Any one of the above also corresponding with a change of between 0% and >99% in any organoleptic attribute or characteristic in the raw meat.

In at least one embodiment the any one or more of above described embodiments are directed to a non-meat food processing activity applied mutatis mutandis as well as a process combining meat and non-meat food processing activities. Examples of such non-meat food processing activities includes but is not limited to raw agricultural product processing, fruit processing, vegetable processing, grain processing, and any combination thereof.

While this invention may be embodied in many different forms, there are described in detail herein specific preferred embodiments of the invention. The present disclosure is an exemplification of the principles of the invention and is not intended to limit the invention to the particular embodiments illustrated. All patents, patent applications, scientific papers, and any other referenced materials mentioned herein are incorporated by reference in their entirety. Furthermore, the invention encompasses any possible combination of some or all of the various embodiments mentioned herein, described herein and/or incorporated herein. In addition the invention encompasses any possible combination that also specifically excludes any one or some of the various embodiments mentioned herein, described herein and/or incorporated herein.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

All ranges and parameters disclosed herein are understood to encompass any and all subranges subsumed therein, and every number between the endpoints. For example, a stated range of "1 to 10" should be considered to include any and all subranges between (and inclusive of) the minimum value of 1 and the maximum value of 10; that is, all subranges beginning with a minimum value of 1 or more, (e.g. 1 to 6.1), and ending with a maximum value of 10 or less, (e.g. 2.3 to 9.4, 3 to 8, 4 to 7), and finally to each number 1, 2, 3, 4, 5, 6, 7, 8, 9, and 10 contained within the range. All percentages, ratios and proportions herein are by weight unless otherwise specified.

This completes the description of the preferred and alternate embodiments of the invention. Those skilled in the art may recognize other equivalents to the specific embodiment described herein which equivalents are intended to be encompassed by the claims attached hereto.

The invention claimed is:

1. A method of reducing microbial populations on food, the method comprising:
   (A) feeding fresh water and an antimicrobial agent or antimicrobial agent precursor into a mixing device secured to a water stream for food processing, the mixing device comprising:
      (1) a first conduit comprising at least one inlet and outlet;
      (2) a second conduit comprising a first inlet and a second inlet and at least one outlet, wherein said first conduit secures to said second conduit and traverses the second conduit; and
      (3) a mixing chamber comprising an outlet, wherein the second conduit secures to the mixing chamber and wherein the outlets of the first and second conduits are in fluid communication with the mixing chamber;
      wherein the fresh water is introduced into the inlet of the first conduit of the mixing device and the antimicrobial agent or antimicrobial agent precursor is introduced into one or more inlets of the second conduit;
   (B) mixing the antimicrobial agent or antimicrobial agent precursor and fresh water in the mixing chamber of the mixing device to form an antimicrobial solution; and
   (C) introducing the antimicrobial solution into the water stream.

2. The method of claim 1, wherein the mixing device is connected to the water stream via an adaptor.

3. The method of claim 1, wherein the water stream is part of a raw meat spray chamber or dip tank.

4. The method of claim 1, wherein the water stream is a fruit or vegetable processing stream.

5. The method of claim 1, wherein the water stream is a non-meat processing stream.

6. The method of claim 1, wherein the water stream is an agricultural product or grain processing stream.

7. The method of claim 1, further comprising introducing a used antimicrobial solution into the inlet of the first conduit along with the fresh water.

8. The method of claim 7, wherein the used antimicrobial solution has been collected from the water stream and filtered.

9. The method of claim 1, wherein the antimicrobial agent is selected from the group consisting of peracid, acidified sodium chlorite, halogen compound, quaternary ammonium compound, organic acid, mineral acid, phosphoric acid, and mixtures thereof.

10. The method of claim 1, wherein the antimicrobial agent or antimicrobial agent precursor is a peracid or peracid precursor selected from the group consisting of hydrogen peroxide, acetic acid, octanoic acid, and mixtures thereof.

11. The method of claim 1, wherein the antimicrobial agent or antimicrobial agent precursor is acidified sodium chlorite or acidified sodium chlorite precursor selected from the group consisting of metal chlorite, acid, and mixtures thereof.

12. The method of claim 11, wherein the fresh water is introduced into the inlet of the first conduit, the metal chlorite is introduced into the first inlet of the second conduit, and the acid is introduced into the second inlet of the second conduit.

13. The method of claim 11, further comprising forming an acidified sodium chlorite antimicrobial solution in the mixing chamber.

14. The method of claim 13, wherein the acidified sodium chlorite antimicrobial solution in the mixing chamber comprises from about 0.01% to about 0.1% of the metal chlorite.

15. The method of claim 11, wherein the acid has a pKa from about 2.0 to about 4.4.

16. The method of claim 13, wherein the acidified sodium chlorite antimicrobial solution in the mixing chamber has a pH from about 2.2 to about 4.5.

17. The method of claim 11, wherein the acid is present in an amount sufficient to maintain a chlorite ion concentration in the form of chlorous acid of not more than 35 wt. % of the total chlorite ion concentration in the acidified sodium chlorite antimicrobial solution in the mixing chamber.

18. The method of claim 3, wherein the water stream is a poultry chiller.

19. The method of claim 1, wherein the method uses a plurality of mixing devices.

20. The method of claim 1, further comprising a sensor for measuring the antimicrobial solution concentration or pH of the water stream and a controller in communication with the sensor for adjusting either the concentration of the antimicrobial solution or pH in the water stream.

21. The method of claim 1, wherein the mixing last from about 5 microseconds to about 500 milliseconds.

* * * * *